US007045927B2

(12) United States Patent
Britz

(10) Patent No.: US 7,045,927 B2
(45) Date of Patent: May 16, 2006

(54) COMMUTATOR

(75) Inventor: Rory Britz, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/988,236

(22) Filed: Nov. 12, 2004

(65) Prior Publication Data

US 2005/0134138 A1 Jun. 23, 2005

(30) Foreign Application Priority Data

Nov. 12, 2003 (DE) ................................ 103 52 829

(51) Int. Cl.
*H02K 13/00* (2006.01)
*H01R 39/00* (2006.01)

(52) U.S. Cl. ....................................... 310/235; 310/236

(58) Field of Classification Search ........ 310/233–237, 310/4.3; 228/122.1, 180.1, 188, 194
See application file for complete search history.

(56) References Cited

U.S. PATENT DOCUMENTS

| | | | | |
|---|---|---|---|---|
| 4,603,474 | A * | 8/1986 | Gobrecht et al. | 29/597 |
| 4,845,395 | A * | 7/1989 | Bost | 310/233 |
| 5,047,480 | A * | 9/1991 | Leitz et al. | 525/207 |
| 5,494,604 | A * | 2/1996 | Chung | 252/299.01 |
| 5,932,949 | A * | 8/1999 | Ziegler et al. | 310/236 |

FOREIGN PATENT DOCUMENTS

| | | | |
|---|---|---|---|
| JP | 358217449 | * | 6/1982 |
| JP | 360099151 | * | 6/1985 |
| JP | 407156279 | * | 6/1995 |

* cited by examiner

*Primary Examiner*—Tran Nguyen
(74) *Attorney, Agent, or Firm*—Abelman, Frayne & Scwab

(57) ABSTRACT

A commutator for commutator motors has a glass carrier body (11), and a plurality of electrically conductive segments (16) which are arranged at an outer circumferential surface (15) of the carrier body (11).

9 Claims, 2 Drawing Sheets

COMMUTATOR

BACKGROUND OF THE INVENTION

1. Field of the Invention

The present invention is directed to a commutator for commutator motors having a carrier body with a plurality of electrically conductive segments arranged on the outer circumference of the carrier body.

2. Description of the Prior Art

In commutator motors, commutators of this kind are mounted on the armature shaft of the commutator motor. Contact segments arranged at the commutator are electrically connected to armature windings at the armature shaft.

Commonly used commutators are made of duroplastics with inserted copper segments and are pressed onto armature shafts.

DE 38 32 106 A1 discloses a commutator in which the carrier element comprises a glass fiber-reinforced phenolic resin with mica particles embedded therein.

A primary disadvantage of the commutator of this kind, which is based on a plastic, is that the segments must be embedded over a relatively large space in order to enable sufficient holding forces at high rotating speeds. Due to the resulting larger outer diameters, friction increases at the carbons and wear therefore increases. If the commutator is heated to more than about 160° C. due to overloading of the motor, an irreversible deformation of the commutator can occur. This results in worsened commutation making it necessary to repair or replace the commutator. Another disadvantage consists in the aging of the plastic by ozone which is formed in the electric arc between the carbon and commutator during operation of the commutator motor. Over longer periods of time, electrical safety margins can be reduced to critical values in this way.

JP 11 187 621 discloses a commutator with a ceramic carrier body in which the electrically conductive surface segments are formed by a notched copper layer.

This is disadvantageous due to the low dielectric strength of the ceramic and higher production costs.

Therefore, it is the object of the present invention to develop a commutator of the type mentioned above which avoids the disadvantages mentioned above and can be manufactured in a favorable manner.

SUMMARY OF THE INVENTION

This and other objects of the present invention, which will become apparent hereinafter, are achieved by making the carrier body of the commutator entirely of glass so that it can withstand high temperatures and has improved dielectric strength at the same time. The glass carrier body also has a low temperature expansion so that commutation is not worsened at increased temperatures due to high load. Further, the commutator according to the invention can be produced inexpensively. A further advantage consists in the resistance of the glass carrier body to chemical corrosion so that, e.g., the commutator does not age due to heat or ozone.

Further, it is advantageous when the carrier body is made of a transparent or at least translucent glass. Due to this step, the carrier body can be glued to the armature shaft of an armature with light-curing adhesives, e.g., UV-curing glues. Adhesives of this kind likewise have a high resistance to temperature.

It can likewise be advantageous when the carrier body is formed of a glass tube portion. As a result, the cost of raw materials for the carrier body is very low.

It is further advantageous when the carrier body has an outer surface which is cylindrical in particular and which is coated at least in some portions by an electrically conductive material. The portions can also be generated in that the outer surface is coated in its entirety initially and intermediate spaces without coating are subsequently produced by abrasion of material. With this step, a durable connection can be made between electrically conductive material and the glass carrier body. The coating is advantageously made of copper.

The coating can advantageously be formed as a cold-gas sprayed copper layer which is applied to the outer surface in a cold-gas spray process. In this way, the copper coating almost has the electrical conductivity of pure copper. The portions of the coating are advantageously provided with and conductively connected with segments, e.g., connection segments.

The segments are likewise advantageously made of copper and are arranged on the coating or on the portions at the carrier body in the form of a copper rosette as stamped bent parts. The rosette segments are subsequently divided into individual segments, e.g., by means of mechanical separation. The commutator according to the invention can be manufactured in a favorable manner by means of this step.

A durable connection between the carrier body and the segments is achieved when the segments are connected to the copper coating on the outer surface of the carrier body by a weld connection.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
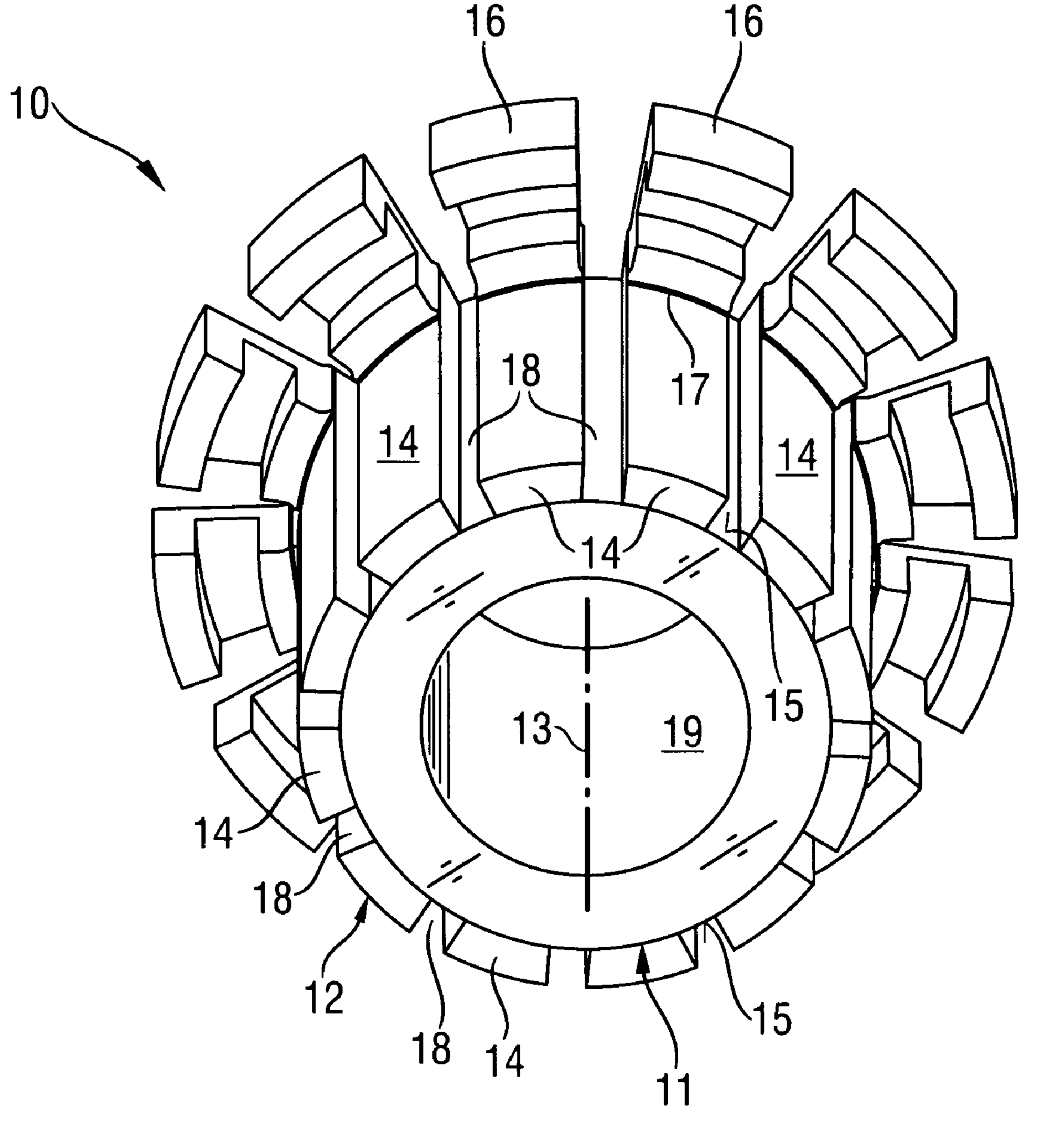
FIG. 1 shows a perspective view of a commutator according to the invention.
Figure 2:
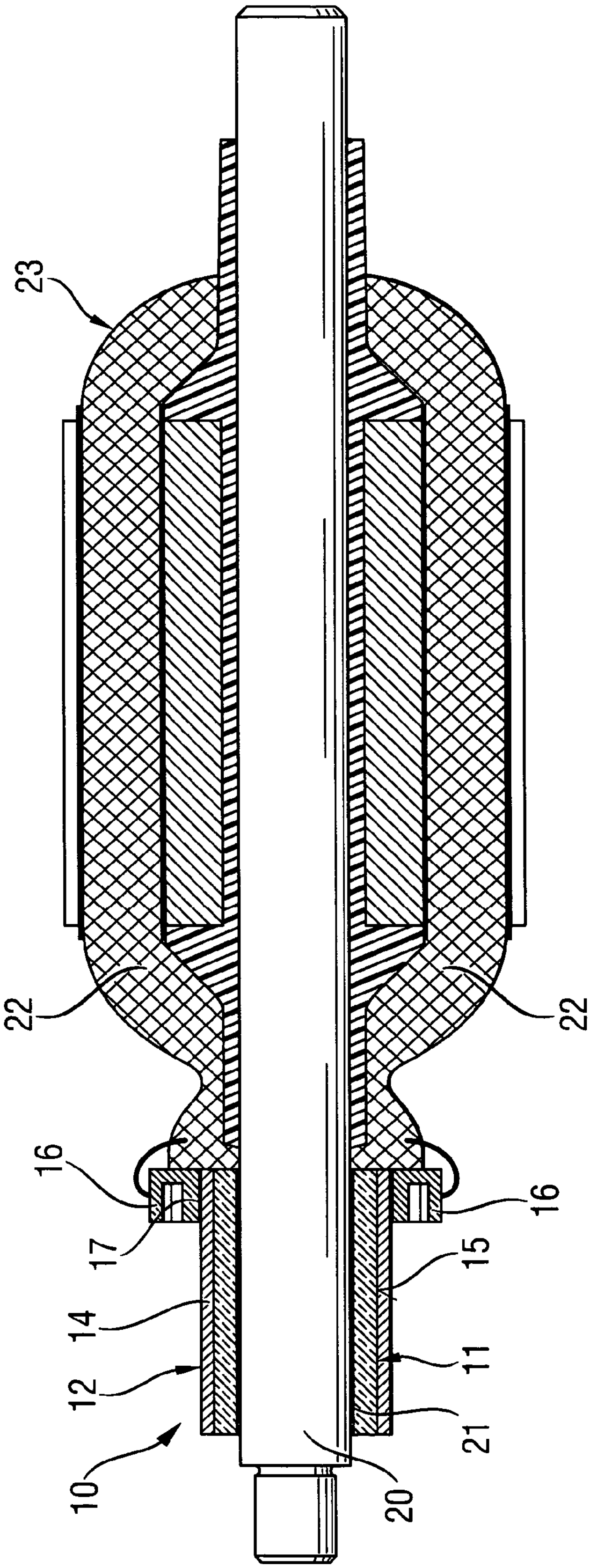
FIG. 2 shows a longitudinal cross-sectional view of an armature shaft of a commutator motor with a commutator according to FIG. 1.

According to FIG. 1, a commutator 10 according to the invention has a cylindrical carrier body 11 provided with a coating 12 that is divided into portions 14 which extend coaxial to the cylinder axis 13 of the carrier body 11 and which are separated by free spaces 18 and electrically insulated with respect to one another. In the present example, the coating 12 is made of copper which has been applied to the outer surface 15 of the carrier body 11 by a cold-gas spray process. An electrically conductive segment 16, e.g., a connection segment, is secured to each of the individual portions 14 of the coating 12 by a weld connection 17. In a commutator motor, the commutator 10 according to the invention is arranged with its bearing opening 19 on an armature shaft 20 (see FIG. 2) to which it is secured, e.g., by a light-curing glue connection 21. This glue connection is advantageously first made possible in that the carrier body 11 is made of a light-permeable glass, particularly a glass tube portion. The portions 14 of the commutator 10 can then cooperate in a known manner with brushes, e.g., with carbon brushes, of the commutator motor. Each of the portions 14 is connected by electrically conductive segments 16 with a winding 22 of the armature coil 23.

Though the present invention was shown and described with references to the preferred embodiment, such is merely illustrative of the present invention and is not to be construed as a limitation thereof, and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. Commutator for commutator motors, comprising a carrier body (11) formed entirely of glass, and a plurality of electrically conductive segments (16) arranged at an outer circumferential surface (15) of the carrier body (11).

2. Commutator according to claim 1, wherein the carrier body (11) is formed of transparent, clear glass.

3. Commutator according to claim 1, wherein the carrier body (11) is formed of a glass tube portion.

4. Commutator according to claim 1, wherein the outer circumferential surface (15) of the carrier body (11) is coated at least in some portions with an electrically conductive material.

5. Commutator according to claim 4, wherein a coating (12) provided on the outer circumferential surface is formed of copper.

6. Commutator according to claim 5, wherein the coating (12) on the circumferential surface (15) is formed by a cold-gas sprayed copper layer.

7. Commutator according to claim 1, wherein the segments (16) are formed of copper.

8. Commutator according to claim 1, wherein the segments (16) are connected to a copper coating (12) provided on the circumferential surface (15) of the carrier body (11) by a weld connection (17).

9. Commutator according to claim 8, wherein the coating (12) is divided into a plurality of portions (14), each of which is connected to a respective segment (16).

* * * * *